Sept. 12, 1961 P. SCHNECKE 2,999,971
POWER CURRENT RECTIFIER WITH SEMICONDUCTING RECTIFIER UNITS
Filed July 9, 1959 8 Sheets-Sheet 1
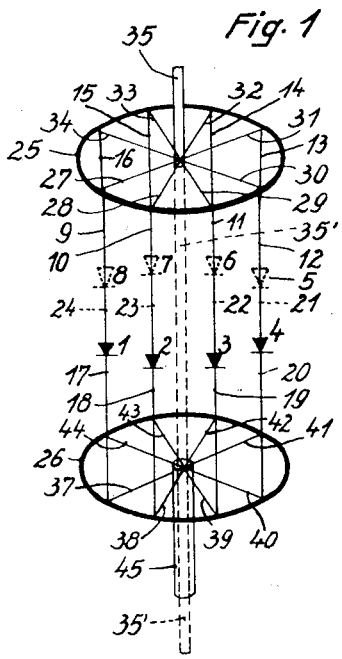
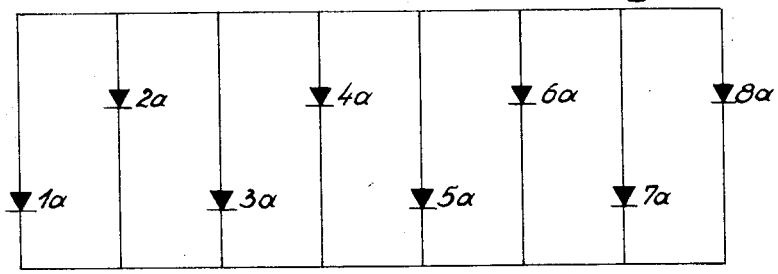
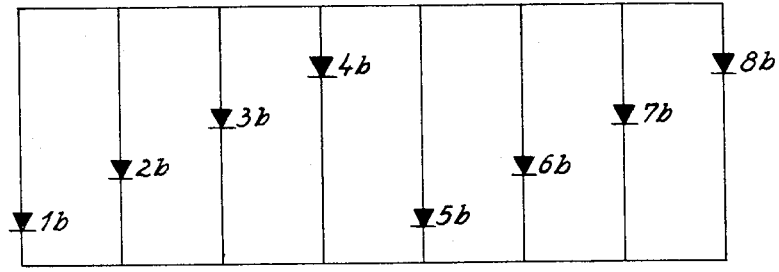

Sept. 12, 1961  P. SCHNECKE  2,999,971
POWER CURRENT RECTIFIER WITH SEMICONDUCTING RECTIFIER UNITS
Filed July 9, 1959  8 Sheets-Sheet 2
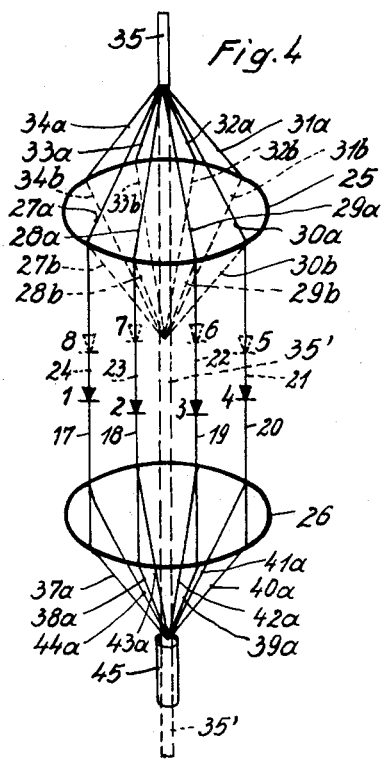
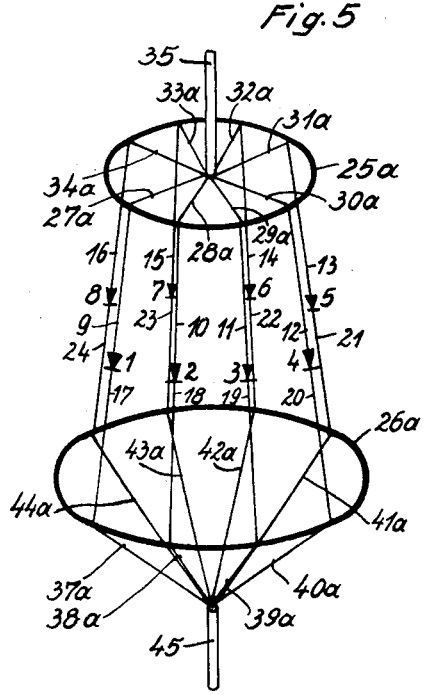
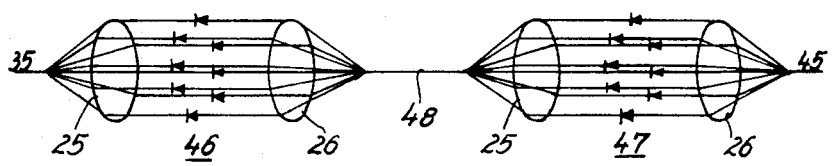
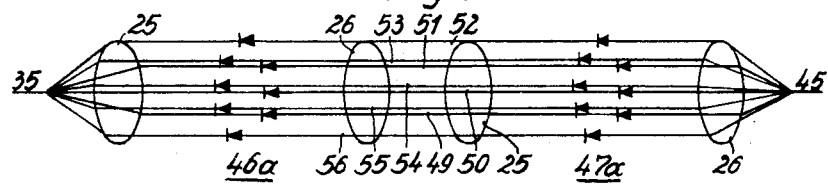

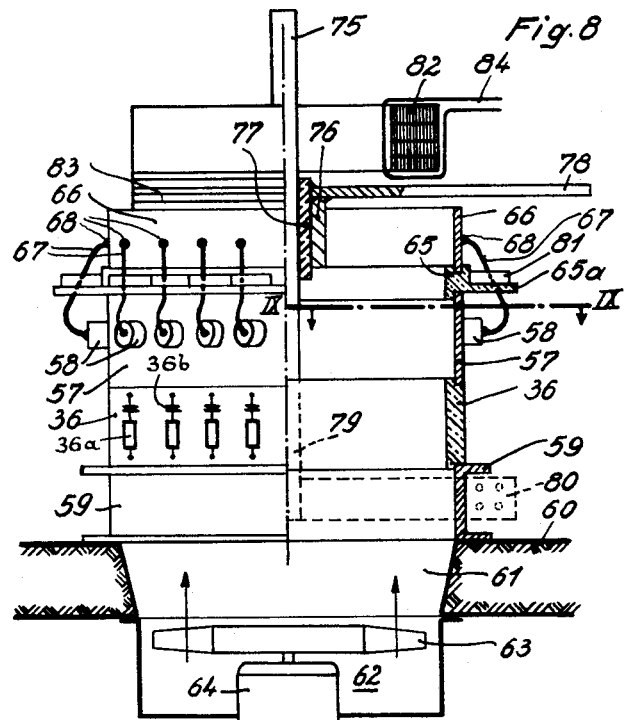
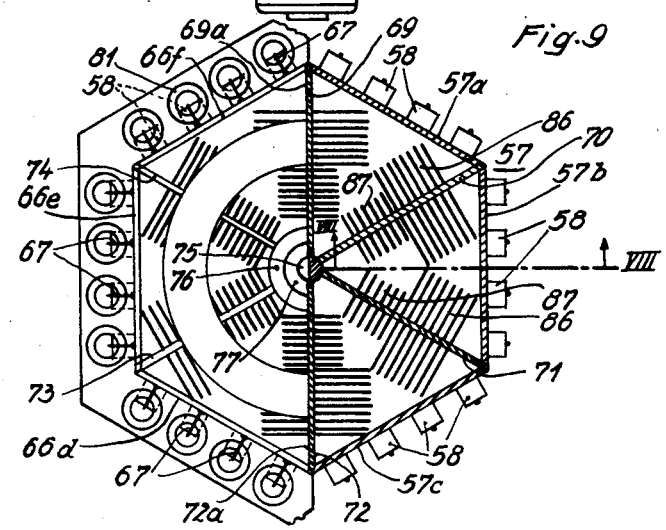

Sept. 12, 1961  P. SCHNECKE  2,999,971
POWER CURRENT RECTIFIER WITH SEMICONDUCTING RECTIFIER UNITS
Filed July 9, 1959  8 Sheets-Sheet 4
FIG. 8a
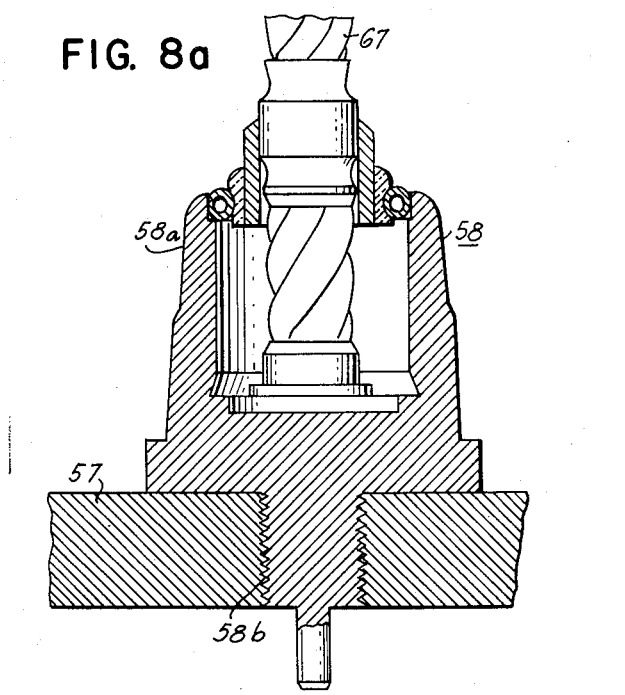
FIG. 8b
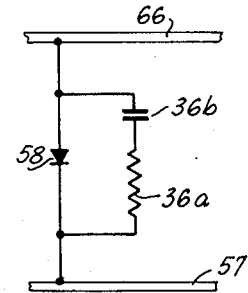
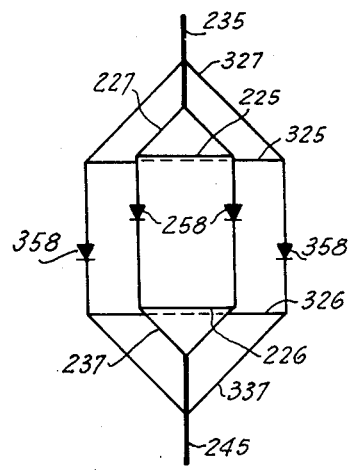
FIG. 18
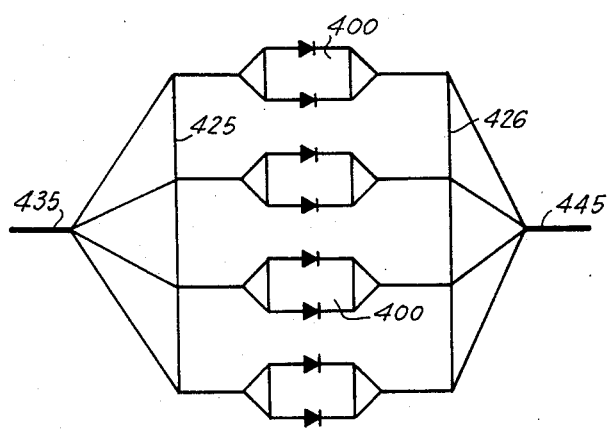
FIG. 19

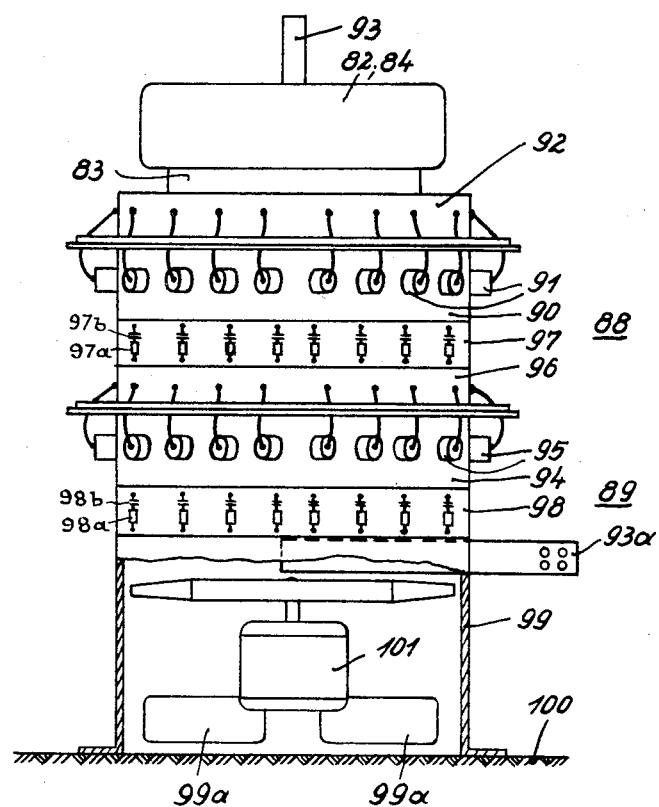

Sept. 12, 1961  P. SCHNECKE  2,999,971
POWER CURRENT RECTIFIER WITH SEMICONDUCTING RECTIFIER UNITS
Filed July 9, 1959  8 Sheets-Sheet 6

Sept. 12, 1961  P. SCHNECKE  2,999,971
POWER CURRENT RECTIFIER WITH SEMICONDUCTING RECTIFIER UNITS
Filed July 9, 1959

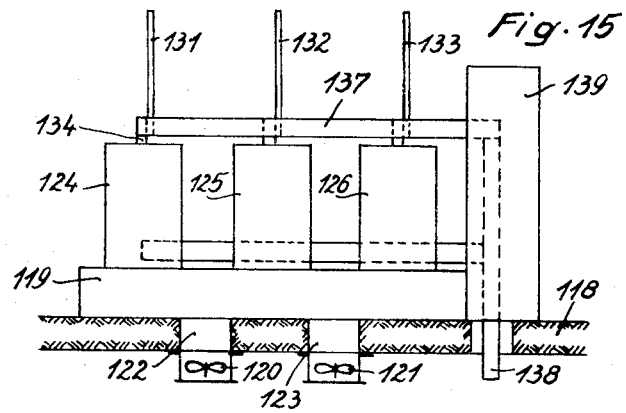
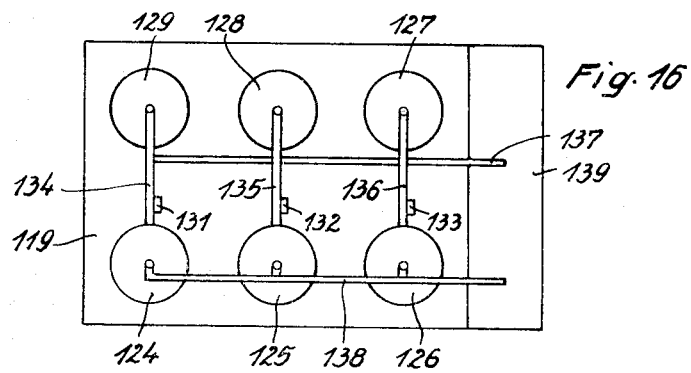
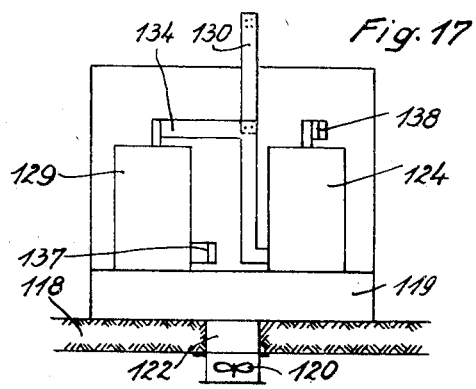

United States Patent Office 2,999,971
Patented Sept. 12, 1961

2,999,971
POWER CURRENT RECTIFIER WITH SEMICONDUCTING RECTIFIER UNITS
Paul Schnecke, Berlin-Siemensstadt, Germany, assignor to Siemens-Schuckertwerke, Aktiengesellschaft, Berlin, Germany, a corporation of Germany
Filed July 9, 1959, Ser. No. 825,939
Claims priority, application Germany July 10, 1958
26 Claims. (Cl. 321—27)

My invention relates to rectifier plants for high power currents operating with rectifier units or "valves" of the semiconductor type, for example rectifier units with a semiconducting crystalline body of germanium, silicon or similar semiconductor substance.

It is often necessary in such plants to provide a number of individual rectifier units in parallel connection per feeder line, because an individual semiconductor unit would not be capable of alone conducting the normal operating current of the plant. However, it is difficult to secure a uniform distribution of the total current load upon the parallel connected rectifier units. It has been proposed, for this purpose to interconnect the parallel rectifier units in such a manner that these units are located in electric leads arranged in accordance with the rungs of a ladder, the common entrance feeder being connected to one side piece of the ladder system at the upper end thereof, whereas the exit feeder is connected to the lower end of the other side piece. As a result, the resistances for the component flows of current through the respective rectifier units are of equal magnitudes between the connection points of the ladder system.

However, it has been found that such a ladder system of rectifier connections fails to secure a satisfactory uniform distribution of the total current loading upon the parallel connected rectifier units, due to the fact that certain amounts of current for different rectifier units pass through common conductor pieces of a given direct-current resistance. Investigation has shown that in such a ladder system of rectifier units, those leads and rectifier units that form the ladder rungs near the ends of the ladder conduct a greater share of the total current than those leads and rectifier units that are remote from these ends.

Aside from the foregoing observations, based upon direct-current phenomena, it is further of interest that the current flowing through each individual rectifier unit of such a ladder-type system is intermittent. As a consequence, each of the rung leads that contains a rectifier unit produces variable magnetic fields, namely a field when the blocking action of the individual unit becomes effective, and another field when the blocking action of that unit decays. Thus, each of several adjacent rung leads containing a rectifier unit and traversed by currents of the same polarity, generates a variable magnetic field which affects the leads and rectifier units of the other parallel conductor branches. This too, causes a different distribution of the current upon the parallel connected semiconductor units of the ladder-type rectifier system. The latter effect is opposed to the phenomenon first explained with reference to the direct-current behaviour of the ladder system. That is, the rectifier units and rung leads which in the ladder system are located at the respective ends of the ladder, are so influenced by the variable magnetic fields that the rungs near the ends of the ladder tend to carry smaller amounts of current than those remote from the ends. Although the two above-mentioned phenomena essential to the subdivision of the total current upon the parallel branches and rectifier units, are mutually opposed, they do not cancel each other. In general, the resultant effect is such that the first-explained phenomenon of non-uniform current distribution predominates over that last explained.

It is an object of my invention to provide a power-current rectifier apparatus with semiconducting rectifier units connected in parallel relation to each other, which greatly minimizes or eliminates the shortcomings of the known power rectifiers of this type by securing a more uniform load sharing of all parallel branches than heretofore obtainable.

According to my invention, the parallel connected rectifier units, inclusive of their entrance and exit leads, are arranged relative to one another in accordance with the longitudinal rods in the peripheral surface of a cage-like system, the cage rods being symmetrically disposed with respect to the center axis through the upper and lower base areas of the cage shape, and the feeder leads or buses common to the parallel connected rectifier units in the "rods" of the cage system are located on that center axis and connected with the "rods" by connecting leads which extend radially from the cage axis in uniform distribution.

In such a cage system, any one of the semiconductor units, inclusive of its entrance and exit leads that form a cage rod electrically in parallel to all other cage rods of the system, is fully equivalent to any other of these cage rods relative to the direct-current and magnetic-field phenomena discussed above. As a result, the total current load of the entire cage system is uniformly shared by all units under all load conditions, the units having all the same rating.

The above-mentioned radial connecting leads may extend in two radial planes so as to define the two planar end faces of the substantially cylindrical or polygonal cage shape, or to define respective planes parallel to the end faces. However, the radial connecting leads between the rod portions of the cage system and the centrally located feeders may also extend from the axis of the cage shape in inclined relation thereto so that the connecting leads form the lateral edges of a pyramid whose apex is connected with the common feeder line, whereas the individual "rods" of the cage shape with respective rectifier units are connected to the corners at the base of the pyramid.

According to another feature of my invention, two such pyramid-shaped assemblies of connecting leads are used at respective longitudinally opposite sides of the cage rods. These pyramid-shaped systems of connecting leads, whose pyramid bases are identical with or adjacent to the bases of the cage shape may be so arranged and spaced that the height of the pyramid extends either away from the cage rod assembly or extends inwardly into the hollow space of the cage shape.

It should be understood that, while it is essential for the purpose of the invention that the rectifier units with the immediately adjacent entrance and exit conductor be arranged and connected similar to the straight rods in the peripheral surface of a cage shape, the axial extent of the individual semiconductor units and their immediately adjacent conductors need not necessarily and not strictly be located on the straight axis of the respective cage rods. It suffices if the rectifier units themselves are located relative to one another to satisfy the requirement for an over-all assembly of the above-described cage shape which is peripherally closed upon itself and receives its current supply on the axis of the cage structure. In other words, the semiconductor units themselves if desired, may have their respective axes extend at a right angle or radially with respect to the axis of the cage "rod" in which the unit is located, so that only the entrance and exit leads of the individual units are generally located in a plane determined by the position of the rod axis.

The cage shape of a power rectifier apparatus according to the invention may have an essentially circular or polygonal cross section. Furthermore, the two base areas of the cage shape need not have equal size. That is, the fundamental shape of the cage may be that of a truncated pyramid or truncated cone. The semiconductor units in the respective rods of the cage shape may be mounted either at the same height relative to the base of the cage structure, or they may be located at respectively different heights. For example, the rectifier units in peripherally successive cage rods may be located in such a manner that the connecting line passing from each unit to the next following and so forth, has zigzag shape. Another way of mounting the units at respectively different heights is to give each following unit a progressively different height in such a periodical manner that a connecting line drawn from each to the next following unit has sawtooth shape.

The invention is also applicable in cases where each of the parallel connected branches of the rectifier network, that is, each of the individual rods of the cage structure, comprises a plurality of semiconductor units in series connection with each other.

According to another feature of my invention, a single power rectifying apparatus is composed of several cage systems of the type described above. These systems are combined with one another so as to be located coaxially one above or behind the other. When giving two or more component cage systems of such an apparatus respectively different cage diameters, they may also be disposed one within the other. The component cage systems of such apparatus may be electrically interconnected in parallel or in series, depending upon the particular power requirements to be met. The correlation of the component cage systems may be so chosen that the cage rods of one cage system are peripherally displaced from those of the other cage system, which in some cases is favorable for conveniently accommodating the various connecting leads and feeder buses of the assembly. When using series-connected groups of rectifier systems of which each comprises a number of rectifier units in parallel, the respective cage systems of the group may be all of the same type and may be mounted in coaxial relation to each other. In such plural-system assemblies, according to one type of design, the entrance and exit leads to and from the cage rods of each system extend between the ends of these respective rods on the one hand and the symmetry axis of the individual cage shape on the other hand. This, however, is not absolutely necessary if, as mentioned above, the construction is such that a plurality of semiconductor units are located in each cage rod. Thus, for the purpose just mentioned, two cage systems can be disposed with their respective base areas adjacent to each other, so that respective cage rods of adjacent cage systems are aligned with each other and can be electrically interconnected directly or through short connecting pieces.

For rectifier plants of very large current-carrying capacity, the fundamental cage design of apparatus according to the invention can further be modified by using a complete cage system of the type described above as a composite unit in the cage rod of a larger cage system whose individual cage rods are then composed of assemblies which in themselves already comprise a cage system according to the fundamental features of the invention discussed above.

The hollow space defined by a cage system according to the invention can be utilized for accommodating other components or accessories of the rectifier plant, or, if desired, for mounting integral components of the individual semiconductor units or unit groups. For example, according to another feature of my invention, the cooling vanes of the semiconductor units are mounted in the hollow space of the cage shape, and the same hollow space also serves as a conduit for a cooling agent to dissipate heat from the vanes. The cooling thus effected may be of the convection type or may operate with a forced flow of gaseous or liquid coolant which, if desired, may cooperate with re-cooling devices in a coolant circulation system.

In high-power rectifier plants according to the invention, the above-described spacial arrangement of the parallel semiconductor units, mounted on a common carrier or respective individual carriers, may result in leaving vacant spaces or surfaces between the semiconductor units and their respective leads. These vacant spaces or surfaces can further be utilized, according to the invention, for accommodating components or accessories of the rectifier plant. It is known, for example, in rectifier plants to connect the individual rectifier units with auxiliary circuit components for compensating or counteracting the so-called crowding of charge carriers during commutation. Such auxiliary devices, for example, consist of capacitors or a series connection of capacitors and resistors, or similar combinations of impedance components, which are connected in parallel to each individual semiconductor rectifier unit or to groups of series-connected units. When using such accessory components, they may be located spacially between adjacent rectifier units or within the enclosed space of the cage system.

However, the accessory or auxiliary components of the power rectifier plant may also be mounted on separate carriers of a design adapted to the cage shape which are coaxially connected with, or inserted between, the components of the cage structure proper so as to form part of the cage system.

For optimum utilization of the hollow space within the cage shape, a plurality of rectifier units may have one or more cooling elements in common. For this purpose, a plurality of semiconductor units are preferably mounted on a common carrier which is joined through one or more heat-conducting bridges with a common system of cooling vanes located in the hollow cage space where vanes are exposed to a flow of coolant.

The above-mentioned and more specific objects and features of my invention will be further explained in the following with reference to the embodiments of high-power rectifier apparatus according to the invention illustrated by way of example on the accompanying drawings in which:

FIG. 1 is a schematically perspective diagram of a cage assembly of semiconductor rectifier units.

FIGS. 2 and 3 schematically illustrate a planar development of the cage perimeter in two different modifications respectively.

FIGS. 4 and 5 are schematically perspective diagrams of two other fundamental cage systems according to the invention.

FIGS. 6 and 7 illustrate, likewise in schematic perspective, respective diagrams of two rectifier assemblies each composed of two cage systems individually similar to that of FIG. 4.

FIG. 8 is a part-sectional front view of a rectifying apparatus embodying the cage principle of FIG. 1, the section being taken along the line denoted by VIII—VIII in FIG. 9; FIG. 8a shows in section one of the rectifier units in the apparatus according to FIGS. 8 and 9, or according to any of the other embodiments; FIG. 8b is a schematic circuit diagram showing an individual semiconductor-rectifier unit connected with parallel impedances according to the apparatus shown in FIGS. 8, 9 or in FIG. 10; and FIG. 9 is a part-sectional top view of the rectifying apparatus shown in FIG. 8, the section being along the line IX—IX in FIG. 8.

FIG. 10 is a schematic front view, partly in section, of another rectifying apparatus composed of two cage systems in accordance with the principle embodied in FIGS. 6 or 7.

Figure 11:
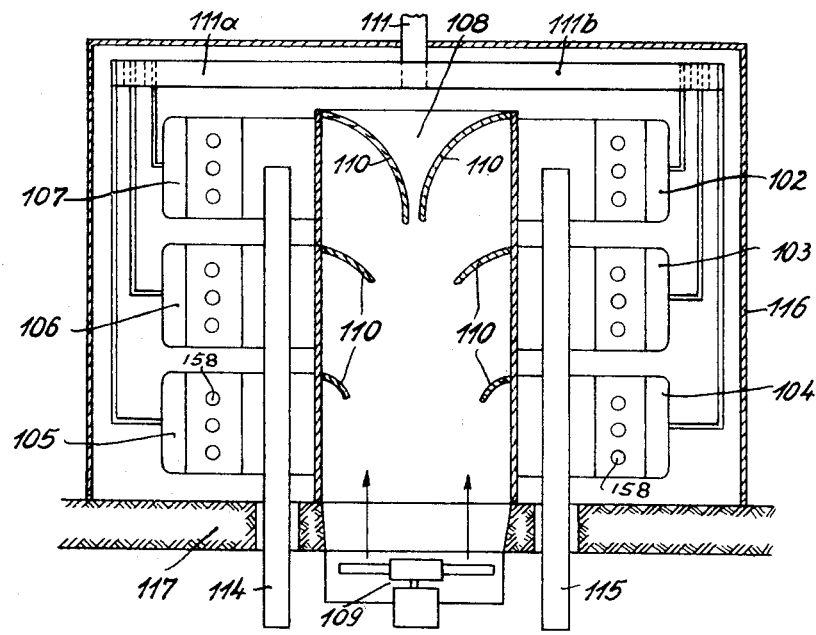
Figure 12:
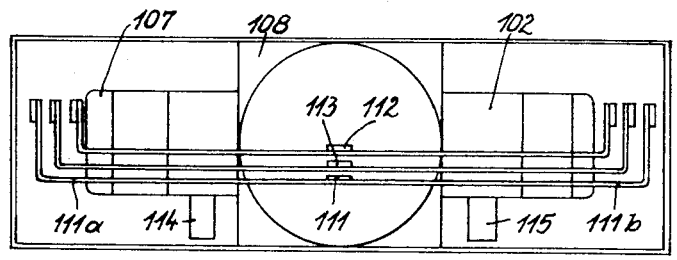
Figure 13:
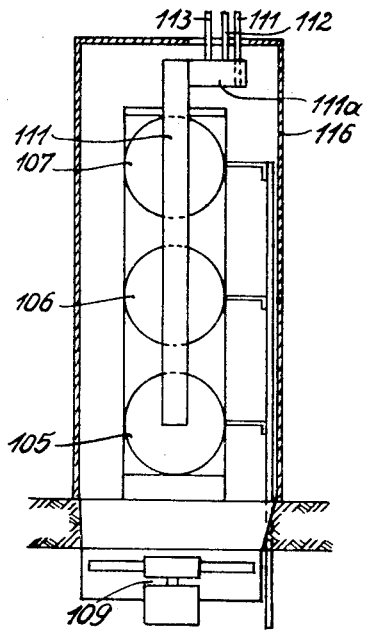

FIG. 11 is a part-sectional front view, FIG. 12 a top view, and FIG. 13 a side view of another rectifying apparatus which embodies a three-phase bridge network comprising a total of six cage-type subassemblies of rectifying units.

Figure 14:
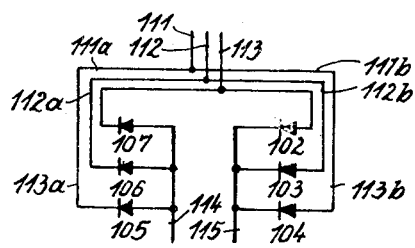

FIG. 14 is a schematic circuit diagram relating to the rectifying apparatus according to FIGS. 11 to 13.

FIG. 15 is a schematic front view, FIG. 16 a top view, and FIG. 17 a side view, of still another embodiment of rectifying apparatus with a total of six cage-type subassemblies in three-phase bridge-network connection.

FIG. 18 is a simplified schematic diagram of two concentric cage assemblies of rectifier units of which one is coaxially located within the other.

FIG. 19 is a simplified schematic diagram of a rectifier assembly which comprises in each of its cage-rod portions a subassembly consisting of a cage system of parallel connected rectifier units.

According to FIG. 1, a number of semiconductor-rectifier units, all of the same rating, are parallel connected in a feeder line. The units, together with the appertaining current leads, are arranged like the longitudinal, straight rods that define the peripheral surface of a cage structure. The feeder line thus including the entire group of parallel elements consist, for example, of one of the three star-connected phase lines in a three-phase system, or the feeder line may form one branch of a rectifier bridge network.

In the example illustrated in FIG. 1, eight individual rectifier units or "valves" denoted by 1 to 8, are connected parallel to each other in one and the same feeder line. The corresponding entrance leads are denoted by 9 to 16, and the respective exit leads by 17 to 24. The entrance leads 9 to 16 commence at a common ring conductor 25 which constitutes the periphery of the upper circular base of the cylindrical cage shape. The exit leads 17 to 24 are interconnected by a common ring conductor 26 which constitutes the periphery of the lower base of the cylindrical shape. The ring 25 is connected with a common entrance feeder bus 35 through radially extending leads 27 to 34 respectively. Similarly, the ring 26 at the bottom of the cylindrical cage structure is connected by radially and inwardly extending leads 37 to 44 with a common feeder bus 45. In this embodiment, the group of entrance leads 27 to 34 and the group of exit leads 37 to 44 are located in the respective radial base planes of the cage shape. Since rings 25 and 26 are electrical conductors, the number of the radial leads extending from the feeder 35, as well as the number of the radial leads 37 to 44 extending to the feeder 45, may also differ from the number of the entrance leads 9 to 16, or exit leads 17 to 24 of the rectifier elements.

According to FIG. 1, the central feeders 35 and 45 extending in coaxial relation to the cylindrical cage structure may also be so designed that one of the feeders is made tubular, as shown for the feeder 45, and the other feeder may then pass through the tubular feeder as is shown by broken lines for the feeder 35. That is, when using the feeder 35' as a supply bus for the radial leads 27 to 34 in the top plane of the cage assembly, then the feeder 35, shown in FIG. 1 as extending upwardly from the top plane, may be eliminated.

FIGS. 2 and 3 show schematically and in planar development two respective embodiments of the rectifier grouping on the peripheral area of the cylindrical cage assembly. According to both illustrations, the semiconductor-rectifier units in peripherally successive cage rods are mounted at respectively different heights above the bottom of the cage assembly. In FIG. 2 the units are denoted by 1a to 8a. In FIG. 3 they are denoted by 1b to 8b. As mentioned above, the connecting line of successive rectifier units according to FIG. 2 is a zigzag line, whereas in FIG. 3 this line has saw-tooth shape with different steep flanks on each tooth. Such coordination of the semiconductor units permits giving the entire assembly a relatively compact over-all size while preserving a uniform distribution of the rectifier units and a correspondingly symmetrical position with respect to the axis of the cylindrical cage shape. In such systems, for example, the lateral extent of the assembly may protrude at the individual rectifier units beyond the base area which may be prescribed by the need for installing the assembly upon a given area or adjacent to a second cage assembly of the same type.

The embodiment shown in FIG. 4 differs from that of FIG. 1 by a different disposition of the radial leads between each common feeder 35 or 45 and the vertical "rods" or the ring members 25 and 26 of the cage assembly. The radial entrance leads are denoted in FIG. 4 by 27a to 34a, and the corresponding exit leads by 37a to 44a. Each group of radial leads defines a conical surface with a circular base. It is further indicated in FIG. 4 by broken lines that such a conical arrangement of the radial leads need not necessarily extend axially away from the cage assembly but may also extend inwardly into the hollow space defined by the cage shape, this being exemplified by the broken-line leads denoted by 27b to 34b. In this case, too, a concentric design of the feeders 35 and 45 for the respective groups of leads 27a to 34a and 37a to 44a may be used, as shown by broken lines representing a feeder 35' which substitutes the feeder 35 and passes coaxially through the tubular feeder 45.

In the embodiment schematically shown in FIG. 5 the cage assembly is not straight cylindrical but has the shape of a truncated cone due to the fact that the ring members 25a and 26a, which determine the base planes of the cage shape, have respectively different diameters. It is also apparent from FIG. 5 that the disposition of the radial leads between the feeders and the ring members may differ at the two base planes respectively. Thus, the radial leads 27a to 34a extending from feeder 35 are all located in a common plane, whereas the leads 37a to 44a connected with feeder 45 define together a conical shape having a circular base.

FIG. 6 exemplified an embodiment of a rectifier system in which two cage assemblies, denoted as a whole by 46 and 47 respectively, have the same type of design and are coaxially mounted between the feeders 35 and 45. The radial leads extending from each base plane in each cage shape define together a conical surface on a circular base. The apexes of the two cones pointing toward each other are electrically connected with each other by an intermediate bus 48.

According to FIG. 7, two cage shapes are connected in series with each other between the two feeders 35 and 45. In this case, however, each of the two cage units 46a and 47a has one of its base planes located adjacent to that of the other. The mutual electric connection of the two cage assemblies therefore can be effected by means of short intermediate connecting leads 49 to 56, or by a direct electric connection of axially adjacent cage-rod ends.

The rectifier apparatus illustrated in FIGS. 8 and 9 embodies the principles explained above, particularly with reference to FIG. 1. The apparatus comprises a metallic carrier ring 57 to which all individual rectifier units 58 are fastened. The housings 58a (FIG. 8a) of such rectifier units are normally provided with a screw bolt (58b) by means of which they can be directly screwed into threaded bores of the carrier ring 57. If desired, however, the threaded bolts of the respective rectifier units may freely pass through corresponding bores of carrier 57 to which they are then fastened by means of respective nuts screwed onto the inwardly protruding threaded portions of the respective bolts. In the latter case the housing of each rectifier unit forms a flange or planar surface which is in area-contact with the inner surface of the carrier ring 57 in order to provide the desired good electrical and thermal contact. The fastening of the rectifier units 58 to the carrier ring 57 also secures a good electrical and thermal junction of the units with the ring. As is apparent, particularly from FIG. 9, the carrier ring 57 in this particular embodiment has a polygonal perimeter. The individual sides of the polygon visible in FIG. 9 are denoted by 57a to 57c. The polygonal ring 57 is coaxially mounted on a ring 36 of insulating material which is supported by a metal ring 59 of U-shaped cross section mounted on the base or foundation of the electrical plant. The inner cross section of the supporting ring 59 merges with an opening 61 in the floor of the plant beneath which a blower 62 is mounted. The rotor 63 of the blower is driven by an electric motor 64 and operates to maintain an air current in the direction of the vertical arrows shown in FIG. 8.

Placed upon the upper rim of the carrier ring 57 is an insulating ring structure 65 which carries a metal ring 66 of polygonal shape, the individual sides of the polygon shape visible in FIG. 9 being denoted by 66b to 66f. The metal ring 66 serves as a common bus conductor, the individual rectifier units 58, all of the same rating, being connected by flexible cables 67 with respective terminal points 68 of the bus ring 66.

A comparison of the rectifier apparatus according to FIGS. 8 and 9, as far as described, with the schematic illustration in FIG. 1, shows that the circular ring 26 of FIG. 1 corresponds to the carrier ring 57 in FIG. 8, and the circular ring 25 in FIG. 1 corresponds to the carrier ring 66 in FIG. 8. For completing the system of FIGS. 8, 9 in analogy to FIG. 1, it remains necessary to describe the radially extending leads and feeder buses.

The radial electric leads are formed by the bridge structures denoted in FIG. 9 by 69 to 74. These structures extend radially from the central symmetry axis of the polygon shape to the respective corners of the polygonal perimeter. Located in the center of the polygon and serving as common entrance feeder and common exit feeder for the parallel-connected rectifier units, are two conductor structures 75 and 76 which are mounted in concentric relation to each other and are kept separate from each other by an electrically insulating sleeve 77. In the right-hand portion of FIG. 9 there are visible the bridges 69 to 72 which terminate centrally at the feeder conductor 75 and outwardly in the corners of the metallic carrier ring 57. Visible in the left-hand portion of FIG. 9 are the bridges 72a, 73, 74 and 69a which extend between the tubular feeder 76 and the corners of the metallic ring 66. Consequently 69 and 69a or 72 and 72a represent a pair of conductors which are located vertically above each other at respectively different heights. Connected to the tubular feeder conductor 76 is a bus bar 78 which extends outwardly away from the rectifier apparatus.

As explained above with reference to the provision of concentrically mounted feeder components, the common inlet feeder and the common outlet feeder of the parallel connected rectifier units may also be formed by conductor pieces which are located spatially behind or above each other preferably in mutually coaxial relation. Such an alternative type of design is schematically indicated in FIG. 8 by a conductor part 79 shown by broken lines, and a bus bar 80 that extends radially and outwardly from part 79. In such a design, the bus bar 80 together with the part 79 form the entrance feeder to the system of radial leads comprising, for example, the bridge structures 69 to 72, whose outer ends are electrically connected with the metallic carrier ring 57.

Also shown in FIGS. 8 and 9 is a ring of polygonal shape 65a consisting of insulating material. The ring 65a and the insulating ring 65, bracing the metal rings 57 and 66 against each other, may also be made of a single integral piece of insulating material. The insulating ring 65 serves as a carrier for the iron cores of a number of current transformers 81. These transformers are correlated to the respective connecting leads 67 between each one of the rectifier units 58 and its connection point 68 on ring 66. That is, each of the conductors 67 forms the primary winding of one of the respective current transformers. The transformers serve as overload-current or as reverse-current transformers for protective or regulating purposes. They may be of the saturable type and for this purpose are preferably provided with an iron core of high-quality ferromagnetic material, for example nickel-iron or cobalt-iron. The core of each transformer may carry a pre-magnetizing or bias winding and, if desired, may be designed as a tape-wound ring core.

The insulating carrier ring 36, if desired, is available as a support for circuit components usually employed as accessories of a semiconductor rectifier apparatus. Thus in FIG. 8 there are shown for each of the rectifier units a series-connection of a resistor 36a and a capacitor 36b mounted on the insulating ring 36 and connected directly across the terminals of each semiconductor unit 58 (FIG. 8b). Such circuit components parallel to each rectifier unit, are suitable in many cases for improving commutation by controlling or modifying the crowding of charge carriers and its detrimental effects upon commutation between the rectifier units. The schematically illustrated series-connection of a capacitor and an ohmic resistor to each individual rectifier unit represents only one example of such commutation-improving accessories.

A rectifier apparatus with semiconductor units, as described, may also be operated in accordance with the delayed-commutation principle known from mercury-arc rectifiers. According to this principle, the conductive interval of the individual valve unit during each conductive half-wave period of the alternating voltage commences at a given moment after the commencement of the positive half-wave so that only a controlled portion of the half-wave is permitted to pass through the unit. For this purpose, a saturable reactor controllable by pre-magnetization is connected in series with each individual valve unit. The saturation degree of the reactor is adjusted by means of a controllable direct current in accordance with the desired delayed-commutation control. During the positive half-wave, the reactor becomes saturated and then reduces its reactance to permit the flow of current through the valve unit. The reactor then remains in this condition until the load current flowing through the reactor reaches its next following zero passage. Such a saturable control reactor is schematically shown in FIG. 8. The iron core of the reactor denoted by 82 is carried by an insulating ring-shaped body 83 on top of the ring 66. The working winding of the reactor, to be traversed by the load current, is formed directly by the feeder bus 75. The direct-current winding for pre-magnetizing and thus controlling the saturable reactor is schematically shown at 84.

FIG. 9 further shows how the hollow space enclosed by the jacket of the cage structure can be used for accommodating parts of the electric plant. As shown, the radial bridges 69 to 72 visible in the right-hand portion of the illustration, which serve as electric connecting leads between the central feeders 75 and the corners of the polygonal ring 57, also serve to support cooling vanes for effectively dissipating the electric heat losses from the individual rectifier units 58. The bridges that extend in the left-hand portion of the apparatus in radial relation to the carrier ring 57 of the rectifier units 58, which bridges, however, are located beneath the visible bridges 72a, 73, 74 and 69a and are connected with the ring 66, are also used as carrier for such cooling vanes. The cooling vanes are denoted by 86 (mounted on bridges 69 to 72) and 87 (mounted on the other set of bridges.) The groups of vanes 86 and 87 form two radially sequential systems of cooling members. In the cooling-vane system 86, the vanes possess larger areas protruding from the supporting bridge than in the vane system 87. This difference in area of the cooling vanes is chosen in accordance with the spatial conditions obtaining in the hollow space of the cage. If desired, more than two steps relative to differentiation in cooling-vane area may be chosen, the areas increasing stepwise from the center toward the periphery of the ring 57. As apparent from the drawing, the heat losses at the rectifier units are conducted to the cooling vanes through the polygon sides 57a, 57b etc. of the ring structure 57, and through the bridge structures 69 to 72 etc. The performance of these parts relating to the conductance of heat from the rectifier elements to the current of cooling air produced by the blower 62, can be promoted by giving the heat conducting structures such a cross-sectional dimension that the vanes remote from the origin of the heat to be dissipated still exihibit a sufficient temperature gradient relative to the cooling agent for securing effective heat dissipation. Inasmuch as the inner surfaces of the polygonal ring 57 are not needed for accommodating the rectifier units, they may be provided with additional cooling vanes.

While the cooling vanes shown in FIG. 9 have the shape of planar plates, structures for dissipating heat to the surrounding coolant may be given any other suitable shape or design. For example, the cooling bodies may be formed by tubular structures which have their base secured to the carrier that forms the heat conducting connection with the rectifier units, the axis of each tubular structure extending away from the carrier.

An apparatus according to the invention need not necessarily be mounted above an opening in the floor of the plant. Each rectifying apparatus may also be mounted on an uninterrupted floor with the aid of a lantern-shaped supporting structure or upon an individual supporting column designed to afford an effective guidance of a forced flow of coolant, unless the particular operating conditions are such that convection cooling at the individual rectifying apparatus is sufficient. The blower or other impeller for the coolant produces either a pressure current or a suction current, depending upon the particular installation and is mounted at one or the other end of the individual rectifier apparatus.

An apparatus as described above with reference to FIGS. 8 and 9 may be modified by having the housing axes of the individual rectifier units 58 extend parallel to the axis of the cage structure. In this case the carrier for the rectifier units may consist, for example, of a ring-shaped disc whose axial direction coincides with the axis of the fundamental cage shape as is shown in FIG. 8, for example, for the carrier 65a of the transformers 81. In this case the cooling vanes, if desired, may be directly provided at the individual rectifier units themselves, in which case these cooling vanes define together a cylindrical or polygonal channel through which a pressure or suction current of air is passed by means of a blower.

The rectifying apparatus shown in FIG. 10 is fundamentally similar to the one described above with reference to FIGS. 8 and 9 as regards the arrangement and mounting of the individual rectifier units. However, the apparatus of FIG. 10 comprises two cage assemblies so that two rectifier units are connected in series with each other for each cage rod of the composite cage system. The two cage assemblies are denoted as a whole by 88 and 89 respectively. Each of the two systems comprises a ring structure, corresponding to ring 57 in FIG. 8, to serve as a carrier of a number of rectifier units such as those denoted by 58 in FIG. 8; and each system comprises another ring structure corresponding to the one denoted by 66 in FIG. 8 with appertaining radial leads, for example, like those denoted by 69 to 72 or by 69a, 72a, 73 and 74, these radial leads being connected to respective feeders 35 and 45 or to an intermediate feeder connection 48 which electrically interconnects the two bases of the cage structures in the sense of the schematic diagram shown in FIG. 6.

In FIG. 10 the carrier ring of the cage system 88 is denoted by 90, the semiconductor-rectifier units mounted on ring 90 are denoted by 91, and the second connector ring is denoted by 92. Connector ring 92 is connected to the feeder bus 93 by radial leads in the same manner as the feeder 45 in the diagram of FIG. 6 is connected to such radial leads.

In the second cage system 89 of FIG. 10, the carrier ring for the rectifier units 95 is denoted by 94; and 96 denotes the connector ring to which the flexible leads from the other poles of the rectifier units 95 are connected. Radial leads (not visible in FIG. 10) extend from ring 96 inwardly to a central bus lead which in turn is connected by radial leads with the ring 90.

As explained above, such an assembly of two coaxial rectifier systems can be simplified by providing for a direct electric connection between the rings 90 and 96. This can be done through connecting buses or directly by means of the ring 97 which separates the rings 90 and 96 from each other. The rings 90 and 96 may also be directly placed upon each other and, if desired, may be additionally interconnected mechanically and electrically, so that the intermediate ring 97 can be omitted unless it is to be used for such other purposes as for mounting the accessory impedances 97a and 97b. The cage system 89 is supported by an electrically insulating ring 98 mounted on a lantern-shaped body 99 which has large openings 99a for the entrance of air. The second common feeder bus of the column-shaped assembly is formed by a laterally extending bus 93a which is connected to the cage system 89. The lantern structure 99 is mounted on the floor 100 of the plant. A blower 101 is located in the hollow space of structure 99, for passing a flow of cooling air vertically upward through the hollow space within the assembly of cage structures.

As shown, the insulating rings 97 and 98 serve as carriers of resistors 97a, 98a, and capacitors 97b and 98b for the purposes explained above with reference to FIGS. 8 and 8b. While these accessory components are shown schematically only, it will be understood that such and other components to be connected parallel to the individual rectifier units, can conveniently be mounted on the insulating ring structures. The ring 98 thus carries the accessory components that are connected in parallel to the rectifier units 95 on carrier ring 94, whereas the ring 97 carries the corresponding components connected in parallel to the rectifier unit 91 mounted on ring 90 in cage system 88.

In the embodiment according to FIGS. 11, 12 and 13, a total of six subassemblies of semiconductor-rectifier units are provided and are electrically connected in a rectifier bridge network for a three-phase power line. That is the illustrated apparatus comprises one cage-type subassembly for each of the six branches of the three-phase bridge network. In this embodiment the column-shaped subassemblies are mounted on a central carrier structure so that each subassembly extends horizontally away from the common carrier structure. Each of the subassemblies comprises a multiplicity of parallel connected semiconductor units in cage arrangement as described above; and each branch of the parallel cage rods may also contain a plurality of semiconductor units connected in series. Some of the individual units are schematically indicated in FIG. 11 at 158. The six subassemblies of the bridge network are denoted in FIGS. 11 to 13 by 102 to 107 respectively. Each individual cage or column has one of its bases located on one side of the central carrier structure 108 which forms a cooling channel through which a blower 109 passes a current of cooling air. The air current is subdivided into branch currents flowing through the individual subassemblies 102 to 107. The branch currents pass substantially at a right angle to the axis of the cooling channel 108 through the hollow spaces within the individual cage structures 102 to 107. Baffle sheets 110 are provided at the proper locations within the central shaft 108 for satisfactory guidance of the coolant from the central shaft 108 to the respective subassemblies 102 to 107.

The feeder buses for energizing the bridge network from the line or power-input transformer are constituted by three bus rails 111, 112, 113. Each of these feeder buses comprises two branches denoted by *a* and *b* respectively. Thus, for example, the bus rail 111 is split into two branches 111*a* and 111*b* which lead to two different groups of rectifier units in two respective branches of the bridge network. This is more readily apparent from the simplified schematic circuit diagram shown in FIG. 14 in which the mutual correlation of the semiconductor device is shown similar to that used in the three-phase apparatus of FIGS. 11 to 13. Thus, according to FIG. 14 and as described above, the feeder bus 111 is divided into branch buses 111*a* and 111*b* of which the bus 111*a* is connected to one pole of the rectifier-unit group 107, while bus 111*b* is connected to one pole of the group 102. The electric connection between the feeder buses and the other valve groups is similarly apparent. The other poles of the valve groups are connected to the direct-current buses 114 and 115 of the rectifier plant.

Denoted by 116 (FIG. 11) is a housing which forms an outer shell for the entire three-phase apparatus. The alternating-current buses 111 to 113 pass through the top of the shell. The direct-current buses 114 and 115 pass through openings in the floor 117 of the plant. The entire rectifier apparatus is carried by the floor 117 of the plant.

As apparent from the schematic circuit diagram of FIG. 14, the rectifier units must be properly poled in order to result in the layout and arrangement of the buses described above. When using an apparatus having a fundamental design according to FIGS. 8 and 9, the poling must also be chosen in accordance with the particular rectifying circuitry being used. That is, with rectifying units having all the same design and rating, the same pole of the individual encapsuled rectifier unit must be connected to the capsule 58*a* (FIG. 8*a*) which is in connection with a given electrode of the semiconductor; and the common buses 75, 79 and 80 connected with one of the respective connector rings 57, 66, according to FIG. 8, must be properly arranged to extend away from the outer ends of the individual columns.

The groups of parallel connected semiconductor units can be readily adapted for insertion into a bridge network by mutually exchanging the connector rings 66 and 57 if necessary, thus placing the proper one above the other. For example, the subassemblies 105 to 107, stacked above each other, can be given a design in which, within each individual subassembly, the carrier ring 57 is located behind the connector ring 66 viewed from the axis of the cooling channel 108 or from the adjacent base area of the individual column-shaped subassembly. In the group that comprises the subassemblies 102 to 104, the connector ring 66 would analogously be located behind the carrier ring 57 with the rectifier units, also viewed from the axis of the cooling channel 108.

While in the embodiment according to FIGS. 11 to 13 the various semiconductor-rectifier units of a power current rectifying apparatus are arranged on a common support with their respective cage axes extending horizontally, the design of the rectifier plant, according to another embodiment of the invention, may also be made to resemble the conventional rectifying assemblies of mercury vapor discharge vessels. That is, the individual cage-type subassemblies may be mounted, in the manner customary for single-anode discharge vessels, beside each other on the floor of the plant in one or several rows or other patterns of arrangement.

Such an embodiment is exemplified by the one shown in FIGS. 15 to 17. Mounted on the floor 118 of the plant is an air box structure 119 which is supplied with cooling air from blowers 120 and 121 through openings 122 and 123. The air box structure carries six cage groups 124 to 129, each comprising a number of parallel connected semiconductor units in cage arrangement. The six subassemblies form together a three-phase bridge network energized from the power transformer of an alternating-current line through main feeder buses 131 to 133 and bus rails 134 to 136 connected with the respective main buses. The direct-current output buses of the rectifier plant are denoted by 137 and 138. Also mounted on the floor of the plant is an instrument cabinet 139 which is traversed by the direct current buses. Mounted in the cabinet, for example, are the protective devices which respond to overload current or reverse current, as well as auxiliary devices for providing the controlling pre-magnetization of any saturable control reactors or saturable transformers being used.

As mentioned above, a rectifying apparatus according to the invention may comprise one cage system nested within the other. An embodiment of this type is represented by the schematic diagram of FIG. 18. The illustrated system comprises two cage assemblies individually similar to the one described above with reference to FIG. 4. Both cage systems are connected parallel to each other between coaxial feeder buses 235 and 245. Feeder 235 is connected with a ring conductor 225 of the inner cage system by radial leads such as the one denoted by 227. Analogously, the feeder 245 is conected with the other ring conductor 226 of the inner cage system by radial leads such as the one denoted by 237. The semiconductor rectifier units 258 of the inner cage system are disposed in the cage-rods of that system, it being understood that, while only two units are shown, the system may comprise any desired larger number in uniform peripheral distribution. The outer cage system has respective ring conductors 325 and 326 connected by radial conductors 327 and 337 with the respective feeders 235 and 245, the rectifier units 358 of the latter system being disposed in the cage-rods as explained above. It will be understood that two or more of such systems concentrically surrounding each other may also be connected in series or in bridge-network connection with one another.

In the composite rectifying apparatus shown diagrammatically in FIG. 19 in the fashion of FIG. 18, two feeder buses 435 and 445 are connected with respective ring conductors 425 and 426 by radial leads, also as explained above with reference to FIG. 4. However, each of the cage-rod portions of the system comprises its own rectifying cage system such as the one denoted as a whole by 400. This individual cage system is designed also in accordance with the one explained above with reference to FIG. 4.

It will be obvious to those skilled in the art, upon a study of this disclosure, that my invention permits of a great variety of modifications relative to the components of the rectifier plant as well as the circuitry interconnecting these components, and hence may be given embodiments other than those particularly illustrated and described herein, without departing from the essential features of my invention and within the scope of the claims annexed hereto.

I claim:

1. Power-current rectifier apparatus comprising a number of like semiconductor-rectifier units electrically connected in parallel, a system of conductors comprising two feeder buses having a common axis defining the center axis of the cage system, a number of conductor elements extending about said center axis and generally longitudinally thereto, said conductor elements being uniformly distributed about said axis and including said respective semiconductor-rectifier units, and two groups of connecting conductors radiating from each of said respective feeder buses and electrically connecting each bus with said respective cage-rod conductors on axially opposite sides respectively of said units, and means for propelling cooling gas between the radiating conductors.

2. Power-current rectifier apparatus comprising a number of semiconductor-rectifier units electrically connected in parallel, a cage system of conductors comprising two coaxial ring-shaped conductors axially spaced from each other, two feeders on the axis of the cage shape, a group of radial conductors connecting each of said feeders with one of said ring conductors, and cage-rod conductors interconnecting said two ring conductors and extending generally parallel to the cage axis, said cage-rod conductors being uniformly distributed along the perimeter of the cage shape and including said respective semiconductor-rectifier units.

3. In power-current rectifier apparatus according to claim 2, said radial conductors between each feeder and each ring conductor being equal in number to said cage-rod conductors and being uniformly distributed about the cage axis.

4. Power-current rectifier apparatus comprising a plurality of electrically interconnected cage systems according to claim 2, said systems being mounted in coaxial relation to each other.

5. Power-current rectifier apparatus comprising a plurality of like electrically interconnected cage systems according to claim 2, said cage systems being mounted one behind the other in coaxial alignment, and uniformly spaced from each other.

6. Power-current rectifier apparatus comprising a plurality of electrically interconnected cage systems according to claim 2, said cage systems being mounted one coaxially within the other.

7. Power-current rectifying apparatus comprising two cage systems according to claim 2 mounted in coaxial alignment with each other and having respective cage-base areas axially juxtaposed to each other, each two opposite cage-rod conductors of said two respective systems having their mutually adjacent ends connected with each other.

8. In power-current rectifier apparatus according to claim 2, the semiconductor units in adjacent cage-rod conductors being mounted at different heights respectively above the base area of the cage shape.

9. In power-current rectifier apparatus according to claim 2, the semiconductor units in the totality of said cage-rod conductors being mounted at periodically recurring different heights above the base area of the cage shape and forming together a regular zig-zag pattern.

10. Power-current rectifier apparatus according to claim 2, comprising a ring-shaped carrier structure of good conducting metal on which said semiconductor-rectifier units are mounted, each of said units having a terminal of the same given polarity in contact with said carrier structure, whereby said carrier structure forms a common electric conductor for said units.

11. Power-current rectifier apparatus comprising a ring-shaped carrier structure of metal, a number of semiconductor-rectifier units mounted on said carrier structure and peripherally distributed thereon, each of said units having two terminal parts of different respective polarities and having the part of a given polarity in electric connection with said carrier structure, a conducting ring structure coaxial with said carrier structure and axially spaced and insulated therefrom, a number of conductors connecting said respective terminal parts of the other polarity with said conducting ring structure so as to form in totality a cage-like assembly together with said carrier structure and ring structure, two mutually insulated feeder buses extending along the axis of said cage assembly, and two groups of connecting structures electrically connecting said two feeder buses with said carrier structure and ring structure respectively, each of said two groups having said connecting structures extend radially away from one of said respective feeder buses in substantially uniform distribution about said axis.

12. Power-current rectifier apparatus according to claim 11, comprising a channel assembly for coolant, said carrier structure and said ring structure forming coaxially aligned channel-wall portions of said channel assembly, and heat-exchanging parts mounted on said radial connecting structures in the coolant channel space of said channel assembly, whereby said radial connecting structures conduct heat away from said carrier structure and ring structure.

13. Power-current rectifier apparatus comprising a ring-shaped carrier structure of metal, a number of semiconductor-rectifier units mounted on said carrier structure and peripherally distributed thereon, each of said units having two terminal parts of different respective polarities and having the part of a given polarity in electric connection with said carrier structure, a conducting ring structure coaxial with said carrier structure, an insulating ring stucture coaxially mounted between said carrier structure and said conducting ring structure, a number of conductors connecting said respective terminal parts of the other polarity with said conducting ring structure so as to form in totality a cage-like assembly together with said carrier structure and said ring structure, two mutually insulated feeder buses of which one is connected with said conducting ring structure, a group of connector structures electrically connecting said other feeder bus with said carrier structure and extending radially away from said other feeder bus in substantially uniform distribution about said axis, a channel assembly for coolant, said two ring structures and said carrier structure forming coaxially aligned channel-wall portions of said channel assembly, said connector structures being located in the coolant channel space of said channel assembly to dissipate heat from said carrier structure.

14. In a power-current rectifier assembly according to claim 13, said channel assembly comprising a ring-shaped support upon which said carrier structure and said two ring structures are coaxially mounted, said support comprising an insulating ring member coaxially adjacent to said carrier structure, and a number of accessory circuit components connected to said respective semiconductor-rectifier units and mounted on said insulating ring member.

15. In a power-current rectifier assembly according to claim 14 each of said circuit components comprising impedance means connected electrically in parallel to one of said respective units for improving commutation.

16. Power-current rectifying assembly comprising a plurality of apparatus according to claim 13 stacked one coaxially upon the other and mechanically joined together to form a single column with said respective coolant channel spaces merging to a single channel, the semiconductor rectifier units of said respective stacked apparatus being electrically interconnected to jointly form a single power rectifier.

17. Power-current rectifying apparatus according to claim 13, comprising an air impeller coaxially joined with said channel assembly to force coolant through said channel space.

18. Power-current rectifier assembly comprising a columnar duct structure and coolant supply means connected with said duct structure, a number of rectifier apparatus according to claim 13 mounted on said duct structure and having their respective axes extend laterally away from said duct structure, the coolant channel spaces of said respective apparatus communicating with the interior of said duct structure to receive a branched-off flow of coolant therefrom.

19. Power-current rectifier apparatus according to claim 13, comprising a saturation controllable reactor mechanically joined with said apparatus and electrically connected with said rectifier units for delayed-commutation control of the apparatus.

20. Power-current rectifier apparatus according to claim 13, comprising a number of accessory transformers connected with said respective semiconductor rectifier units and mounted on one of said coaxial structures in uniform distribution about said axis.

21. Power-current rectifier apparatus according to claim 13, comprising a number of current transformers having respective secondary windings mounted on said insulating ring structure, each of said windings surrounding one of said respective connecting conductors whereby said conductors form the primaries of said respective transformers.

22. A power-current rectifier apparatus comprising a number of parallelly connected semiconductor rectifier units distributed about a central axis, a first electro-conductive annular member, conductor members connected to the respective rectifier units and to said first annular member at points spaced peripherally of the latter, the distances between the points being substantially uniform, a second electro-conductive annular member, the rectifier units being electrically connected to the second annular member at spaced points, the distances between these points being substantially uniform, two feeder buses having a common axis defining the center axis of the annular members, symmetrically arranged electro-conductive connector members radiating from the common axis and connected between each of the annular members and the respective buses, so that the electrical and magnetical effects produced by the component currents flowing in the respective parallel-connected branches are substantially equal among themselves with respect to parallelly connected branches.

23. A power-current rectifier apparatus comprising a number of parallelly connected semiconductor rectifier units distributed about a central axis, a first electro-conductive annular member, conductor members connected to the respective rectifier units and to said first annular member at points spaced peripherally of the latter, the distances between the points being substantially uniform, a second electro-conductive annular member, the rectifier units being electrically connected to the second annular member at spaced points, the distances between these points being substantially uniform, two feeder buses having a common axis defining the center axis of the annular members, symmetrically arranged electro-conductive connector members radiating from the common axis and connected between each of the annular members and the respective buses, so that the electrical and magnetical effects produced by the component currents flowing in the respective parallel-connected branches are substantially equal among themselves with respect to parallelly connected branches, and means for propelling cooling gas through the annular members, between the radiating connector members.

24. The apparatus defined in claim 23, the radiating connector members carrying cooling fins.

25. A power-current rectifier apparatus comprising a number of parallelly connected rectifier units distributed about an axis, a first electro-conductor annular member, conductor members connected to the respective rectifier units and to said first annular member at points spaced peripherally of the latter, a second electro-conductive annular member, the rectifier units being electrically connected to the second annular member at spaced points, two feeder buses having a common axis defining the center axis of the annular members, symmetrically arranged electro-conductive connector members radiating from the common axis and connected between each of the annular members and the respective buses, and means for causing movement of a current of gas passing between the radiating connector members.

26. The apparatus defined in claim 25, the first and second electro-conductive annular members comprising metal shells, the rectifier units being mounted on and outside of the shell of the second annular member, the shells being electrically insulated from each other and being structurally connected to form a housing, the gas passing within the housing.

References Cited in the file of this patent

UNITED STATES PATENTS 1,845,573   Ackerly _____ Feb. 16, 1932

FOREIGN PATENTS 687,424     Germany _____ Jan. 29, 1940
1,047,945   Germany _____ Dec. 31, 1958